HIGH SPEED LETTER PRINTING SYSTEM

Filed March 21, 1961 2 Sheets-Sheet 1

Inventor
Saburo Uemura by Hill, Sherman, Meroni, Gross & Simpson Attys.

June 7, 1966 SABURO UEMURA 3,254,626

HIGH SPEED LETTER PRINTING SYSTEM

Filed March 21, 1961 2 Sheets-Sheet 2

Inventor
Saburo Uemura by Hill, Sherman, Meroni, Gross & Simpson Attys.

United States Patent Office 3,254,626

Patented June 7, 1966

3,254,626

HIGH SPEED LETTER PRINTING SYSTEM

Saburo Uemura, Tokyo, Japan, assignor to Sony Corporation, Tokyo, Japan, a corporation of Japan Filed Mar. 21, 1961, Ser. No. 97,191
6 Claims. (Cl. 118—637)

This invention relates to a high speed letter printing system and, more particularly, to such a high speed letter printing system in which the letters, marks or numerals are successively magnetically recorded on a magnetic tape, which records are later developed or made visual by attaching ferromagnetic powder thereon, and, thereafter, a series of the visible records is reprinted and arranged row by row on other printing paper or sheet.

One object of this invention is to provide a high speed letter printing system in which a series of letters, marks, numerals, or the combination thereof, previously recorded on a magnetic tape is rearranged row by row on a printing sheet easily and speedily.

Another object of this invention is to provide a high speed letter printing system in which letters, marks or numerals successively and magnetically recorded on a magnetic tape can be transcribed economically row by row on another printing sheet.

Other objects, features and advantages of this invention will be fully apparent from the following detailed description taken in connection with the accompanying figures of the drawings, in which.

Figure 1:
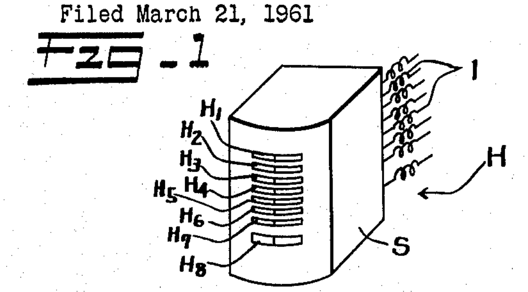
FIGURE 1 is a perspective view of a magnetic head member used in accordance with this invention.

FIGURE 1 is a perspective view of a magnetic head member H used in this invention. In a case where a magnetic tape is employed as a magnetic medium, a plurality of small conventional magnetic heads, seven heads $H_1$, $H_2$, $H_3$, . . . $H_7$, inclusive, in the embodiment illustrated, are arranged at regular short intervals at a right angle with respect to the direction of movement of the tape, namely in the direction of the tape width. The magnetic heads $H_1$ to $H_7$, inclusive, are each provided with a core having an air gap and an operating coil which is wound on the core, and are united in a casing S to form the head member H. Each coil is connected to be energized with a "record" current through a lead wire 1.

Figure 2:
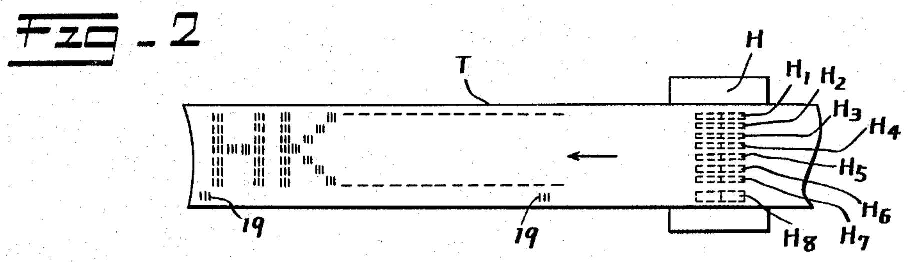
FIGURE 2 is a schematic diagram of a tape and a magnetic head member, and illustrates the manner in which the letters, marks and the like are magnetically recorded on the magnetic tape using the magnetic head member.

FIGURE 2 is a schematic diagram illustrating a method of printing letters on a magnetic tape using the magnetic head H shown in FIGURE 1, and in which the heads $H_1$–$H_7$, inclusive, and a control head $H_8$ are aligned in a column at a right angle with respect to the direction of movement of a tape T.

Figure 3:
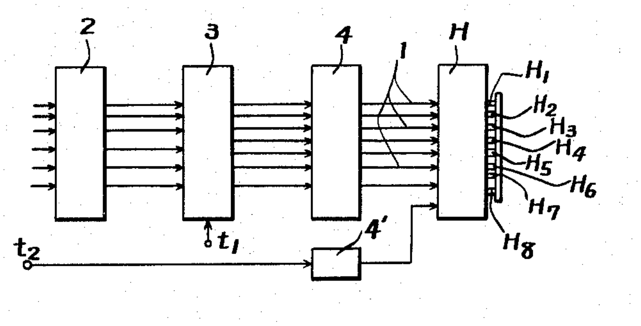
FIGURE 3 is a block diagram which illustrates a system in which a pulse corresponding to a letter or mark is produced and delivered to a magnetic head member.

FIGURE 3 is a schematic diagram of a system for supplying the magnetic head member H with a "record" pulse corresponding to a letter, mark or the like. That is, six bit code pulses from a suitable source are applied to the input of a decoder 2 to produce the six write pulses, namely information pulses corresponding, for example, to each character of the alphabet A, B, C . . . X, Y, Z, and which write pulses are delivered to an encoder 3. The encoder 3 is in the form of a matrix circuit which is controlled by readout pulses from a terminal $t_1$ which arrive at constant predetermined time intervals which are related to the tape speed.

Figure 4:
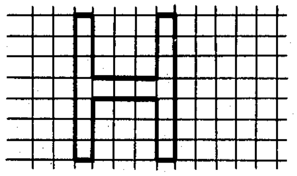
FIGURE 4 is a diagram which illustrates the formation of a letter "H" by way of example.

FIGURE 4 shows a letter "H" to be recorded by way of example by such a head member H. Such a letter is composed of matrix picture elements of five columns and seven rows as divided by horizontal and perpendicular lines. Namely, seven such record pulses are delivered from the encoder 3 through an amplifier 4 to the heads $H_1$–$H_7$ of the head member H by means of the lead wires 1 of the seven channels. As the tape runs either intermittently or continuously, the heads $H_1$–$H_7$ are selectively energized by the seven record pulses five times, thereby forming a character to be recorded. Any desired form of martix memory devices which have been in ordinary conventional use may be applied to this invention.

Thus, pulse currents are selectively applied at certain constant time intervals, to the heads $H_1$ to $H_7$ whereby desired letters, marks or numerals are magnetically recorded in succession on the magnetic tape. These records are later made visible by attaching ferromagnetic powder, for instance, thereon. A series of control signals from the terminal $t_2$ is supplied to the magnetic head $H_8$ through an amplifier 4'.

In accordance with the system of this invention, a magnetic tape on which a series of visible records is made is drawn along at a constant speed and a printing sheet is struck against the magnetic tape instantaneously when a desired series of letters arrives at the proper part of the printing sheet, so that ferromagnetic powder on the tape showing the letter is transferred to the sheet to print the contour of the letter.

Figure 5:
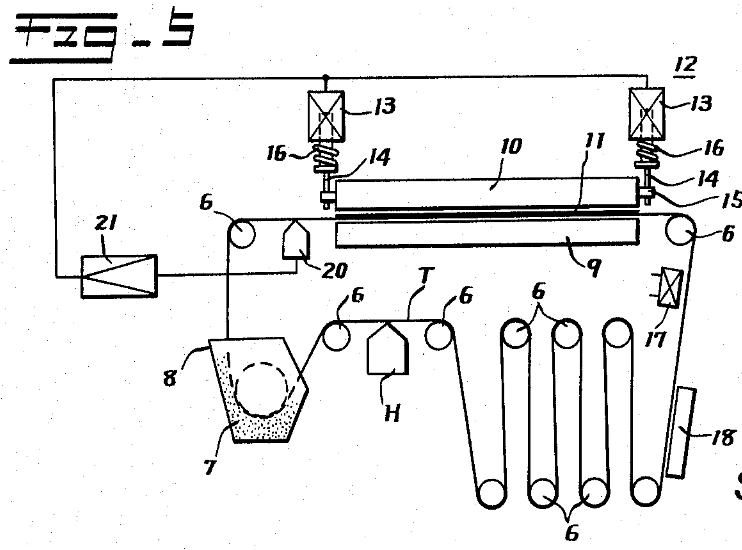
FIGURE 5 is a schematic diagram illustrating the operation whereby a series of letters recorded on a magnetic tape is arranged row by row on a printing sheet in order to obtain the desired visible printing.

FIGURE 5 is a schematic diagram of an arrangement, by way of example of such a printing device.

In this example, an endless magnetic tape T is employed which travels along a plurality of guide rollers 6. The tape is led to the transcription part, across the above mentioned recording head H, and through a tank 8 in which developing ferromagnetic powder 7 is stored. At the transcription part are disposed a platen 9 and a hammer 10 which cooperate to strike the printing sheet 11 against the tape T.

As the tape T with the letters which are made visual by attaching ferromagnetic powder thereon travels to the transcription part, the printing sheet 11 travels in a perpendicular direction relative to the movement of the magnetic tape with the sheet over the tape between the platen 9 and the hammer 10.

Figure 6:
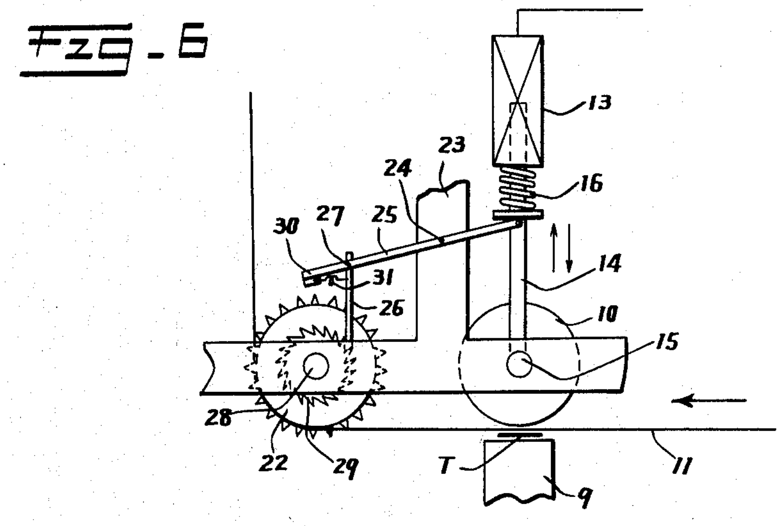
FIGURE 6 is a view in side elevation which illustrates the relationship between a hammer and a printing paper feed device.

With reference to FIGURES 5 and 6, the hammer 10 acts up and down by means of an electromagnetically operated device 12. In this example, a shaft 15 is attached to the hammer 10 and to the lower end of two plungers 14 operated by two solenoids 13. The plungers 14 move downwardly when the solenoids are energized and the hammer 10 strikes the sheet 11 and the magnetic tape T together on the face of the platen 9 instantaneously. 16 represents two return springs for the plungers 14. 17 represents the coil of an erasing head for erasing the magnetic records on the tape T and 18 represents a vacuum brush for brushing off the ferromagnetic powder. A suitable alternating current source (not shown) can be connected to the coil 17.

In order that the hammer 10 may strike the tape T when one line of letters to be printed comes under the hammer, a control signal 19, FIGURES 2, 7, 8 and 9, is recorded on one side margin of the tape T at predetermined intervals. The magnetic head $H_8$ is provided in the magnetic head member H to record this signal, and at the proper recording time the magnetic head $H_8$, records this control signal at predetermined length intervals of the tape. For reproducing the control signal 19 a reproducing head 20 is provided, and the control signal 19 is amplified by an amplifier 21 in order to energize the solenoids 13.

The printing sheet 11 must be transferred automatically line by line every time the hammer 10 moves downwardly. This may be done by any desired mechanism, and FIGURE 6 shows, by way of example, such a device. The printing sheet 11 is a paper having perforations formed on both its side margins. In FIGURE 6 a fixed frame 23 has mounted thereon a lever 25 which is pivoted to a shaft 24, and a sprocket wheel 22 which is pivoted to a shaft 28. One end of the lever 25 is pivoted to one of the plungers 14 and a driving pawl 26 is pivoted to the other end of the lever 25 at a point 27.

The pawl 26 meshes with a ratchet wheel 29 that is mounted on the shaft 28 of the sprocket wheel 22. A spring 31 is provided between an extension 30 and the pawl 26 so that the pawl 26 is always in mesh with the ratchet wheel 29 under proper pressure.

In accordance with this construction, when the plunger 14 is forced down in the printing operation, the pawl 26 slides on the periphery of the ratchet wheel 29 so as not to rotate it, but when the hammer 10 is raised after the printing operation, the pawl 26 meshes with the ratchet wheel 29 and rotates it through a constant angle. Consequently the printing sheet 11 is moved traversely to the tape T as shown by the arrow for the distance corresponding to a line interval between two rows of letters to be printed on the sheet.

Figures 7, 8, 9:
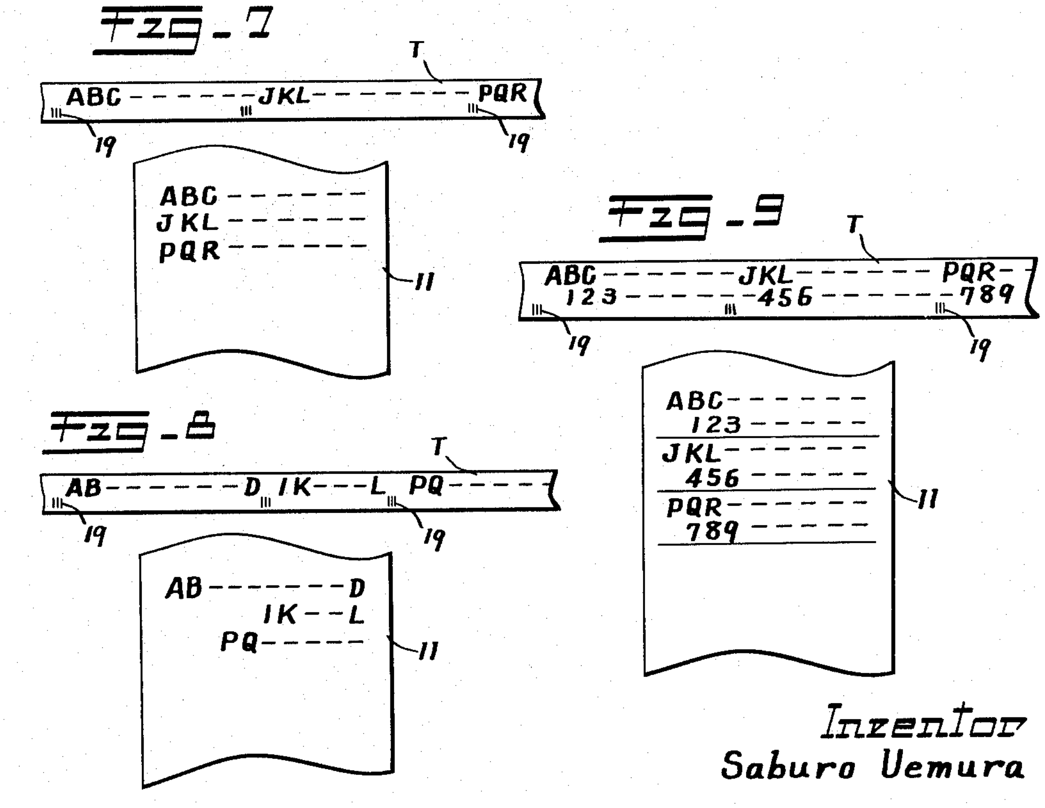
FIGURE 7 is a schematic diagram illustrating the operation whereby visible letters on a magnetic tape are transcribed onto a printing sheet of paper.
FIGURE 8 is a schematic diagram illustrating another example similar to the arrangement shown in FIGURE 7.
FIGURE 9 is a schematic diagram illustrating a further example similar to the arrangement shown in FIGURE 7.

As previously described, the characters are made visible on the tape T and the control signal 19 is recorded on the side margin of the tape T and is reproduced by the head 20. The output of the head 20 energizes the solenoids and the hammer 10 moves up and down once for each line of the printing operation on the printing sheet. Such an operation is repeated so as to transfer a series of the visible characters from the tape T to the printnig sheet 11 row by row with the desired length of the lines of the characters. As shown in FIGURE 7, the characters to be recorded on the tape T are aligned in one line, which characters are printed on the printing sheet row by row. However, they are not always required to be in a line since it is, of course, apparent that they may be printed in two offset lines or more in the manner shown in FIGURE 8.

In the system of this invention the magnetic tape T can easily be moved at a speed of several meters per second in the direction of movement of the tape. At such a speed satisfactory magnetic recording is accomplished easily. According to experiments, the ferromagnetic powder attaches to the magnetic tape when running at such a comparatively high speed in order to make the records visible. The device for transferring the printing sheet is not always limited to the example shown in FIGURE 6. The device can be so constructed properly as to easily move the sheet for the distance from a row to the next row of letters on the sheet at the rate of several rows per second. Therefore, the printing according to this invention can be achieved at a considerably high speed.

In a specific example, the magnetic tape speed is two meters per second and the width of a character is three mm., the letter printing speed is 650 letters per second or 39,000 letters per minute. If 100 letters are in a line a high speed letter printing of 6–7 lines or rows per second can be made. The tape recording and letter printing may be carried into effect at the same speed or at a different speed.

It is not preferable to supply the magnetic tape intermittently. The recording and printing should be made at a constant speed of travel. In this case, even if there is a lack of letters in a line of the tape the line is transferred to the printing sheet as it is. Different row lengths of letters does not matter in this invention. As shown in FIGURE 9, for example, when the control record 19 is made at a proper position with respect to the letters to be printed, the right ends of the rows of letters will be aligned on the same column.

The sources of electrical pulses which are connected to the decoder 2, the readout terminal $t_1$ and the amplifier 4' may be any conventional mechanisms. It is apparent that the number of columns and rows for the letters can be easily varied by adjusting the number of magnetic heads and the number of readout pulses. The magnetic tape T, erasing head 17, and ferromagnetic powder are also all conventional.

It will be apparent that modifications and variations may be effected without departing from the scope of the novel concepts of the present invention.

I claim as my invention:

1. A high speed letter printing system comprising an endless magnetic tape, means for continuously moving the magnetic tape along a closed path, a head member having a plurality of magnetic heads aligned in a column, each of said magnetic heads having an air gap at substantially a right angle with respect to the direction of movement of said magnetic tape, means for delivering a required information signal to said head member in order to record it on the magnetic tape, means for putting ferromagneic powder on the information signal which is magnetically recorded on the magnetic tape in order to make the magnetic record visible, means for moving a printing sheet arranged near said magnetic tape transversely to the direction of movement of the tape, means for recording a control signal at predetermined intervals on said magnetic tape, means for reproducing said control signals, an electro-magnetic device which is energized by the control signals, a hammer which is operated by said electromagnetic device and strikes said magnetic tape and printing sheet, and means for transferring said printing sheet line by line when said hammer returns to its previous position.

2. A high speed letter printing system comprising an endless magnetic tape, means for continuously moving the magnetic tape along a closed path, a head member having a plurality of magnetic heads, each of said magnetic heads having an air gap at substantially a right angle with respect to the direction of movement of said magnetic tape, a decoder for forming an information signal of required characters, an encoder for selectively delivering the information signal to said head member, means for putting ferromagnetic powder on the information signal magnetically recorded on said magnetic tape in order to make the magnetic record of said characters visible, means for moving a printing sheet arranged near said magnetic tape transversely to the direction of movement of the tape, means for recording control signals at constant intervals on the tape, means for reproducing said control signals, an electromagnetic device which is energized by said control signals, a hammer which is operated by said electromagnetic device and strikes said magnetic tape and printing sheet, and means for transferring the printing sheet line by line when said hammer returns to its previous position.

3. A high speed letter printing system comprising an endless magnetic tape, means for continuously moving the magnetic tape along a closed path, a plurality of magnetic heads aligned in a column, means connected to said plurality of magnetic heads for delivering signals representative of characters to be magnetically recorded on the tape, means positioned adjacent said tape for putting ferromagnetic powder on the tape in order to make the recorded characters visible, means for positioning a printing paper adjacent said tape transport path, and means for transferring the ferromagnetic powder from the magnetic tape to the printing sheet, means for magnetically recording control signals on the magnetic tape at predetermined intervals, said transfer means being responsive to said recorded control signals for causing the magnetic tape to strike the printing paper.

4. A high speed letter printing system comprising an endless magnetic tape, means for continuously moving the magnetic tape along a closed path, a plurality of magnetic heads aligned in a column, means connected to said plurality of magnetic heads for delivering signals representative of characters to be magnetically recorded on the tape, means positioned adjacent said tape transport path for putting ferromagnetic powder on the tape in order to make the recorded characters visible, means for positioning a printing paper adjacent said tape transport path, means for causing said printing paper to be struck against the magnetic tape in order to transfer the ferromagnetic powder from the tape to the printing paper, means positioned adjacent said tape transport path for recording a control signal on the magnetic tape, and means responsive to the recorded control signals for causing the printing paper to shift its position in a direction substantially transverse to the direction of movement of the tape.

5. A high speed letter printing system comprising a plurality of magnetic heads, a decoder which is adapted to form an information signal of a recorder character in response to a code pulse, an encoder which is responsive to said decoder for selectively delivering information signals to said plurality of head members, an endless magnetic tape, means for continuously moving the magnetic tape along a closed path across said plurality of magnetic head members, means for applying ferromagnetic powder to the magnetic tape in order to make the prerecorded signals visible, and means for transferring the ferromagnetic powder from the magnetic tape to a printing sheet, means for magnetically recording control signals on the magnetic tape at predetermined intervals, said transfer means being responsive to said recorded control signals for causing the magnetic tape to strike the printing paper.

6. A high speed letter printing system comprising a plurality of magnetic heads, a decoder which is adapted to form an information signal of a recorder character in response to a code pulse, an encoder which is responsive to said decoder for selectively delivering information signals to said plurality of head members, an endless magnetic tape, means for continuously moving the magnetic tape along a closed path across said plurality of magnetic head members in order to magnetically record characters on the magnetic tape in order to make the prerecorded signals visible, means for transferring the ferromagnetic powder from the magnetic tape to a printing sheet, means positioned adjacent said magnetic tape ahead of said plurality of magnetic heads for removing any ferromagnetic powder remaining on the magnetic tape, means for magnetically recording control signals on the magnetic tape at predetermined intervals, said transfer means including a platen and a hammer which are positioned on opposite sides of the magnetic tape and printing sheet, means responsive to the recorded magnetic control signals on the magnetic tape for causing the hammer to move toward the platen and the printing sheet to strike the magnetic tape, and means responsive to the movement of the hammer for causing the printing sheet to shift its position in a direction substantially transverse of the direction of movement of the magnetic tape after each line has been printed.

References Cited by the Examiner

UNITED STATES PATENTS

| | | | |
|---|---|---|---|
| 2,740,354 | 4/1956 | Gruver | 101—134.5 |
| 2,820,956 | 1/1958 | Rueger | 346—74 |
| 2,951,119 | 8/1960 | Conrad. | |
| 2,985,135 | 5/1961 | Hickerson | 118—637 X |
| 3,012,499 | 12/1961 | Amada | 101—93 |
| 3,076,393 | 2/1963 | Campbell et al. | |
| 3,142,840 | 7/1964 | Smith et al. | 364—74 |

OTHER REFERENCES

Berry et al.: "Ferromagnetography-High-Speed Printing With Shaped Magnetic Fields," General Electric Review, July 1952, vol. 55, No. 4, pages 20, 21, 22 and 61.

CHARLES A. WILLMUTH, *Primary Examiner.*

ROBERT A. LEIGHEY, DAVID KLEIN, *Examiners.*

RICHARD H. BERNEIKE, PETER FELDMAN, *Assistant Examiners.*